(12) United States Patent
Kuttenberger et al.

(10) Patent No.: US 7,881,842 B2
(45) Date of Patent: Feb. 1, 2011

(54) RESTRAINT SYSTEM WITH IMPACT RECOGNITION, TAKING INTO ACCOUNT ENVIRONMENTAL INFLUENCES

(75) Inventors: Alfred Kuttenberger, Nufringen (DE); Marc Theisen, Besigheim (DE); Ralf Maier, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 930 days.

(21) Appl. No.: 10/564,224

(22) PCT Filed: Jul. 8, 2004

(86) PCT No.: PCT/DE2004/001475

§ 371 (c)(1),
(2), (4) Date: Apr. 9, 2007

(87) PCT Pub. No.: WO2005/007459

PCT Pub. Date: Jan. 27, 2005

(65) Prior Publication Data

US 2007/0276565 A1 Nov. 29, 2007

(30) Foreign Application Priority Data

Jul. 10, 2003 (DE) ................ 103 31 212

(51) Int. Cl.
*B60R 21/01* (2006.01)
*G01S 15/93* (2006.01)
*G06F 19/00* (2006.01)
(52) U.S. Cl. .......... 701/45; 701/96; 701/301; 180/727; 280/725

(58) Field of Classification Search ........ 701/45, 701/46, 300, 301, 96; 180/271, 727; 280/725
See application file for complete search history.

(56) References Cited

U.S. PATENT DOCUMENTS

| 6,151,539 | A | 11/2000 | Bergholz et al. |
| 6,832,156 | B2 * | 12/2004 | Farmer ............... 701/301 |
| 2003/0051530 | A1 | 3/2003 | Eisele et al. |
| 2004/0254729 | A1 * | 12/2004 | Browne et al. ....... 701/301 |

FOREIGN PATENT DOCUMENTS

| DE | 101 21 519 | 5/2002 |
| DE | 101 41 886 | 3/2003 |
| WO | 98 00730 | 1/1998 |

* cited by examiner

*Primary Examiner*—Tan Q Nguyen
(74) *Attorney, Agent, or Firm*—Kenyon & Kenyon LLP

(57) ABSTRACT

A safety device for vehicles having first sensor arrangement for acquiring the vehicle impact and for outputting first sensor signals, a control device for outputting triggering signals dependent on the first sensor signals, and a restraint system that is triggered dependent on the first sensor signals, second sensor arrangement being provided for the acquisition of obstacles in the vicinity of the vehicle and for the outputting of second sensor signals, and third sensor arrangement being provided for the acquisition of environmental influences on the second sensor arrangement, the second sensor signals output by the second sensor arrangement being used in the control unit for the decision concerning the triggering of the restraint system, after an evaluation of the third sensor signals output by the third sensor arrangement.

23 Claims, 1 Drawing Sheet

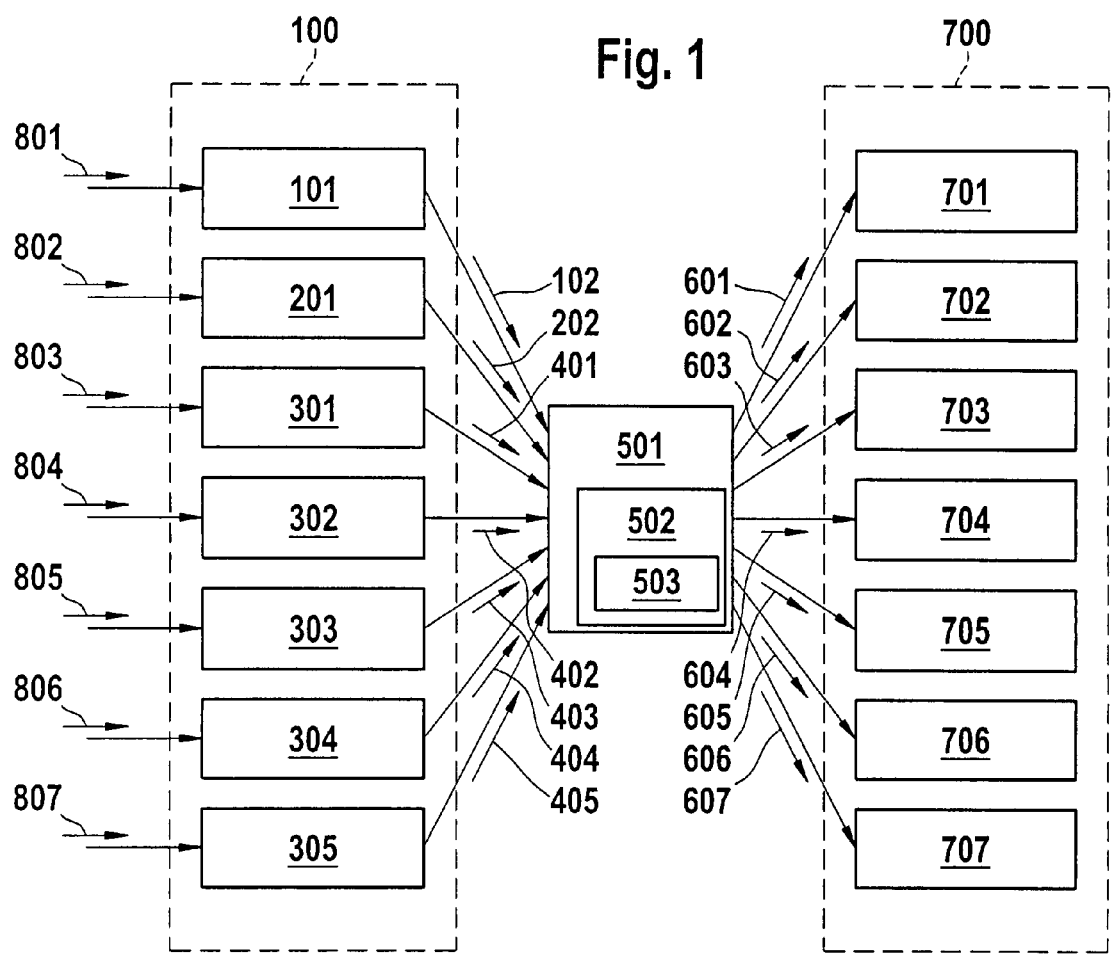

US 7,881,842 B2

RESTRAINT SYSTEM WITH IMPACT RECOGNITION, TAKING INTO ACCOUNT ENVIRONMENTAL INFLUENCES

FIELD OF THE INVENTION

The present invention relates to a restraint system for vehicles, and in particular relates to a safety device for vehicles that can be activated upon, or before, a vehicle's impact against an obstacle.

BACKGROUND INFORMATION

Currently, a variety of sensor means are used in vehicles. These sensor means are used on the one hand to detect surrounding objects, this detection being carried out for example by ultrasound sensors, and are used on the other hand for vehicle impact recognition, by detecting high acceleration values using acceleration sensors.

Additional sensor means in vehicles include sensors for recognizing environmental quantities, such as recognizing rain, measuring temperatures, determining adhesive friction between the vehicle and the roadway, measuring intrinsic speed, and measuring ambient brightness.

Currently, ultrasound sensors in vehicles are used exclusively for convenience functions, such as providing assistance when parking. In this way, ultrasound sensors are used to acquire distances and changes in distances from objects situated in the immediate vicinity of the vehicle.

Evaluation of the ultrasound signals makes it easier for the driver to estimate the distance from the surrounding objects, so that an impact can be avoided, especially at low speeds.

It is to be expected that ultrasound sensors will be used for many functions in the future, because they are inexpensive. Thus, in many vehicles ultrasound sensors will become standard equipment. Because in principle the ultrasound sensors can be used to detect an impact, it is desirable also to use such ultrasound sensors to recognize the threat of an impact. In terms of percentage, the greatest number of accidents take place at a relative speed between the vehicle and the surrounding object that lies within the measurement range of the ultrasound sensors, so that the ultrasound sensors can be used for impact recognition. However, because a recognition of a vehicle's impact with an obstacle is a highly safety-relevant process, the sensor signals delivered by ultrasound sensors must have an extremely high degree of reliability.

Disadvantageously, ultrasound sensor systems currently supply false signals, or no signals at all, when the environmental influences acting on the ultrasound sensors are not favorable. For example, there is the danger that sensors used near the roadway can become dirtied by rain or sprayed water, thus supplying false distance values, or no distance values. At low temperatures, together with rain and snow, ultrasound sensors of this sort often become covered with ice, which also greatly limits the reliability of the sensor signals that they deliver.

A further disadvantage of ultrasound sensor systems is that for physical reasons the ultrasound requires a medium of propagation, namely the air surrounding the vehicle. In a runtime measurement using ultrasound sensors, which is used in order to recognize a relative speed between the vehicle and the obstacle, a significant role is played by the movement of the air against the sensor, for example the wind, at a high intrinsic speed. For the reasons cited, up to now it has not been possible to use the existing ultrasound sensors in vehicles for the recognition of the impact of a vehicle against an obstacle.

SUMMARY OF THE INVENTION

German Published Patent Application No. 37 16 146 describes an ultrasound sensor to be installed at locations, preferably vehicles, that are exposed to low temperatures.

In order to remove the above-mentioned disadvantages of icing, the ultrasound sensor in this publication is provided with a heating device that can be controlled dependent for example on the temperature at the point of installation, so that ice or snow accumulation on the sensor is prevented, thus preventing an adverse effect on the sensitivity or the functioning of the sensor. The ultrasound sensor of this publication can thus be installed even at locations that are subject to icing.

However, a disadvantage of the device described in the above-named publication is that the sensor system is extremely complex and expensive due to the presence of an additional heating device that must be regulated. In addition, the described device removes falsification of the sensor signals due only to icing, while the remaining environmental influences described above, such as for example dirtying of the sensor and variable intrinsic speed of the medium surrounding the sensor, cannot be ruled out.

In addition, in German Published Patent Application No. 101 21 519 an ultrasound obstacle detector has been proposed that enables a detection of external material, such as snow or mud, that adheres to the ultrasound sensor.

In the ultrasound obstacle detector described in the publication, a detection as to whether external material, such as snow or mud, has adhered to the ultrasound sensors takes place on the basis of the monitoring of direct waves from the ultrasound sensors. Disadvantageously, the device described in the above publication requires an additional ultrasound receiver in the vicinity of the ultrasound transmitter, provided for a distance measurement using indirect waves.

In this way, the design of the ultrasound sensor device disadvantageously becomes more complex and more expensive. In addition, it is unhelpful that additional receivers must be provided in addition to an ultrasound sensor used for the measurement, because this increases the constructive size.

In particular, it is not possible for the ultrasound obstacle detector described in the publication to acquire an intrinsic speed of the sensor system with respect to a medium of propagation.

It is therefore an object of the present invention to provide a safety device for vehicles in which a restraint system can reliably be triggered on the basis of ultrasound sensor means even when there is a disadvantageous influence from environmental influences; in particular, impact events at low speeds are to be detected reliably.

An essential idea of the present invention is that the sensor signals supplied by the ultrasound sensor means are to be used for the recognition of an upcoming collision only if it has been ensured that the functioning of the ultrasound sensors is not impaired by environmental influences or the like. Advantageously, a control device determines, on the basis of third sensor signals provided by third sensor means, whether the sensor signals provided by the ultrasound sensor means are correct or not.

A particular advantage of the present invention is that the third sensor means are not attached additionally to the vehicle; rather, already-existing sensors of the vehicle, such as for example rain sensors, temperature sensors, adhesive friction sensors, video or brightness sensors, and systems for determining the intrinsic speed or the adhesive friction, are used as third sensor means.

This results in a considerable economic advantage, because in addition to an acceleration that can be acquired by an acceleration sensor system, ultrasound signals can be used for impact recognition without having to attach additional sensors or monitoring units for ultrasound sensor systems.

Through the combination of conventional first sensor means, which, as acceleration sensors, provide a recognition of a strong braking or a vehicle impact, the ultrasound sensor systems, which are suitable for measuring distances at low speeds, are used to improve the impact recognition, or are used for a pre-crash sensor system. A further advantage of the method according to the present invention is that the restraint system for protecting the vehicle occupants in case of a vehicle impact against an obstacle can be switched to a fallback level if the evaluation of the third sensor signals in the control device, output by the third sensor means, yields the result that the ultrasound sensor signals output by the ultrasound sensor means have been falsified by environmental influences. In this fallback level or fallback position, there is the advantage that the control means make a triggering decision only on the basis of the first sensor means, i.e. those formed as acceleration sensors, and the first sensor signals supplied by these sensor means.

In particular, it is advantageous that the safety device for vehicles has, besides first sensor means for acquiring the vehicle impact or for outputting first sensor signals, a control means for outputting triggering signals dependent on the first sensor means, and a restraint system, which is triggered dependent on the first sensor signals, for protecting the vehicle's occupants when the impact occurs.

The second sensor means, provided for the acquisition of obstacles in the vicinity of the vehicle and for the outputting of second sensor signals, are advantageously formed as ultrasound sensors. The second sensor signals output by the ultrasound sensors are used for the triggering decision only if third sensor signals, supplied by third sensor means, indicate that environmental influences on the second sensor means, or the ultrasound sensors, i.e. the ultrasound sensor means, play no role in a reliable triggering decision. Thus, the second sensor signals output by the ultrasound sensors can advantageously be used for the decision concerning the triggering of restraint means of the restraint system, after an evaluation of the third sensor signals output by the third sensor means in the control device.

The sensing variables acquired by the first sensor means relate in general to acceleration values, while the sensing variables acquired by the second sensor means, or ultrasound sensors, essentially relate to distances and relative speeds to the objects surrounding the vehicle. With the aid of these data, it is possible to determine the impact time, impact angle, and the shape of the object.

The third sensing variables acquired by the third sensor means essentially relate to environmental influences, such as rain, temperature, adhesive friction between the vehicle and the roadway, ambient brightness, and intrinsic speed of the vehicle.

Usefully, the restraint system includes a multiplicity of restraint means, such as for example a driver airbag, a passenger airbag, a knee airbag, a window airbag, a belt tightener, seat actuators, and a roll bar.

The first, second, and third sensor means, formed for example as acceleration sensors, ultrasound sensors, and environmental sensors, provide a sensor system that is contained in a vehicle in a conventional manner.

The third sensor means, provided for the acquisition of environmental influences, include at least a rain sensor, a temperature sensor, an adhesive friction sensor, a video sensor or brightness sensor, and an intrinsic speed sensor. Advantageously, the evaluation of the third sensor signals output by the third sensor means is carried out in the control device by a processor unit, in which an evaluation algorithm is advantageously executed that is provided as hardware or as software. In particular, it is advantageous for the evaluation algorithm for the evaluation of the third sensor signals output by the third sensor means to be embedded in the processor unit.

In the processor unit, it can usefully be determined by a signal supplied by an adhesive friction sensor, or by a signal supplied by another system for determining the adhesive friction, whether there is a danger of dirtying and/or icing of the second sensor means or of the ultrasound sensor means.

BRIEF DESCRIPTION OF THE DRAWING

The FIGURE shows a schematic diagram of a safety device for vehicles having a control device that controls a restraint system in the vehicle dependent on sensor signals that are supplied by a sensor system, according to a preferred exemplary embodiment of the present invention.

In the Figures, identical reference characters designate identical or functionally identical components or steps.

DETAILED DESCRIPTION

The FIGURE shows an illustrative schematic diagram according to a preferred exemplary embodiment of the present invention. The safety device for vehicles shown in FIG. 1 is made up essentially of a sensor system 100, a control device 501, and a restraint system 700. Sensor system 100 is formed by first, second, and third sensor means 101, 201 and 301-305. The first, second, and third sensor means, standardly present in the vehicle, record from their surroundings various variables to be acquired, i.e., first variables to be acquired 801, second variables to be acquired 802, and third variables to be acquired 803-807. The sensor signals output by the first, second, and third sensor means are supplied to control device 501, which is connected with restraint system 700. Restraint system 700 has various restraint means 701-707, in order to protect occupants of the vehicle from injury when the vehicle collides with an obstacle.

In particular, but not exclusively, the restraint system includes a restraint means 701, which is formed as a driver airbag, a restraint means 702 formed as a passenger airbag, a restraint means 703 formed as a knee airbag, a restraint means 704 formed as a window airbag, a restraint means 705 formed as one or more belt tighteners, a restraint means 706 provided in the form of seat actuators, and a restraint means 707 formed as a roll bar. These restraint means are triggered by corresponding triggering signals 601, 602, 603, 604, 605, 606, and 607, which are provided by control device 501, corresponding to a known intensity of a vehicle impact against an obstacle.

While in conventional safety devices for vehicles only first sensor signals 102, provided by first sensor means 101, are used in control device 501 for the triggering decision, the preferred specific embodiment of the present invention provides additional sensor signals, namely second sensor signals 202 and third sensor signals 401, 402, 403, 404, and 405, supplied respectively by second sensor means 201 and by third sensor means 301, 302, 303, 304, and 305.

It is to be noted that first sensor signals 102, supplied by first sensor means 101, are the essential signals required for the triggering of the restraint system, because first sensor means 101 are a conventional crash sensor system, e.g. an acceleration sensor system.

Thus, first sensor signals 102, output by first sensor means 101, supply acceleration values of the vehicle. In the safety device for vehicles shown in FIG. 1, control device 501 has a processor unit 502. In processor unit 502 an evaluation algorithm 503 is executed which is designed in such a way that the differing first, second, and third sensor signals 102, 202, and 401-405 can be processed in order to make a reliable triggering decision, and to communicate this decision to restraint system 700 in the form of triggering signals 601-607, whereupon restraint means 701 to 707 are correspondingly triggered. Evaluation algorithm 503 can advantageously be embedded in processor unit 502.

In the following, sensor system 100 and first, second, and third sensor signals 102, 202, and 401-405, supplied by sensor system 100, are explained in more detail. First sensor means 101 acquire first sensing variables 801, which are standardly acceleration values. Thus, first sensor means 101 are provided as acceleration sensors, whereupon first sensor signals 102 are forwarded to control device 501. Values of a distance or of a relative speed of the vehicle in relation to its surroundings or in relation to obstacles are provided as second sensing variables 802.

According to the preferred exemplary embodiment of the present invention, second sensor means 201 are provided as ultrasound sensor means of an ultrasound sensor system. Second sensor signals 202, output by second sensor means 201, are likewise supplied to control device 501 for further processing. Third sensor means 301, 302, 303, 304 and 305 are sensor means for the acquisition of environmental variables. Thus, third sensor signals 401, 402, 403, 404, and 405, output by third sensor means 301-305, provide information concerning environmental influences on the vehicle, but in particular also on first and second sensor means 101 and 201. Because, as mentioned above, second sensor means 201 are ultrasound sensor means, which react in a sensitive manner to environmental influences, third sensor signals 401-405 are used in particular to monitor the functional capacity of second sensor means 201. Third sensor signals 401-405, output by the third sensor means, are thus likewise supplied to control device 501 and are further processed there.

In the following, third sensor means 301-305 are explained in more detail. It is to be noted that third sensor means 301-305 represent sensors that are standardly situated in a vehicle. In the exemplary embodiment according to the present invention, the third sensor means provide information concerning environmental influences, such as for example rain, temperature, adhesive friction, ambient brightness, and intrinsic speed of the vehicle.

Third sensor means 301, illustrated in FIG. 1, are for example formed as rain sensors that acquire environmental humidity or moisture. With the aid of third sensor signal 401, output by third sensor means 301, control device 501 is informed of the danger of a possible dirtying or wetting of second sensor means 201, i.e., the ultrasound sensors, whereupon evaluation algorithm 503 decides whether second sensor means 201 is functionally impaired, for example by moisture and/or dirtying. In the same way, variables 804 acquired by third sensor means 302 are used to provide temperature information for control device 501.

Third sensor means 303 are for example formed as adhesive friction sensors. Instead of a separate sensor, the estimates available in conventional ESP systems and/or ABS systems and/or ASR systems can also be used. In the following, therefore, the term "adhesive friction sensors" designates both the separate sensors and also such systems for determining adhesive friction. The variables 805 that can be acquired by third sensor means 303 thus relate to an adhesive friction between the vehicle and the roadway. From this adhesive friction, conclusions are drawn concerning a roadway surface that may be icy, covered with snow, or moistened by water, and a possible dirtying and/or icing of the sensors resulting therefrom is evaluated. From this it can be inferred that second sensor means 201 are for example covered by snow, etc.

In combination with third sensor signals 404, provided by third sensor means 304, it is possible to provide a sensing variable 806 in the form of ambient brightness and/or a video signal; in particular, a layer of snow on a roadway is advantageously acquired via a brightness or video sensor 304.

From the coating of snow on the roadway acquired by third sensor means 304, it can be concluded that there is a layer of snow and/or an icing of second sensor means 201, and thus that there is a possible impairment of the functioning of second sensor means 201. In the exemplary schematic diagram of the present invention, third sensor means 305 are formed as intrinsic speed sensors that supply a corresponding third sensor signal 405, concerning the intrinsic speed of the vehicle in relation to a roadway, to control device 501.

Sensing variable 807, acquired by third sensor means 305, thus relates to the intrinsic speed of the vehicle, and provides a reference point concerning the movement of sensor means 201, formed as ultrasound sensors, in relation to the ultrasound medium of propagation, i.e., the air surrounding the vehicle, so that the relative speed between the vehicle and the ultrasound propagation medium has a significant influence on the functional capacity of the ultrasound sensors, or second sensor means 201. Through the evaluation of third sensor signals 401-405, supplied by third sensor means 301-305, it is now possible in control device 501 to make a reliable triggering decision, based also on second sensor signals 202 supplied by second sensor means 201. Thus, ultrasound sensor means can in particular be used also for predictive, safety-critical applications, such as for example the controlling of air bags contained in the restraint systems, pyrotechnic seatbelts, reversible seatbelts, and seat positions for improving the seating position in case of a vehicle collision.

Environmental influences, such as for example snow, ice, rain, or strong wind, which can impair the functioning of second sensor means 201, are reliably recognized by third sensor means 301-305. These environmental influences are communicated to control device 501 in order to prevent impermissible parameters from entering into the triggering decision of restraint means 701-707, or of the overall restraint system 700. In the case that second sensor means 201 supply second sensor signals 202 that supply no information or insufficient information on the basis of the environmental conditions, control device 501 switches to a fallback level.

The control system remains at the fallback level if the evaluation of third sensor signals 401-405, output by third sensor means 301-305, in control device 501 yields the result that second sensor signals 202, output by second sensor means 201, have been falsified by environmental influences. If second sensor signals 202 thus contain no information, or false information, regarding a vehicle impact, this being recognized through third sensor signals 401-405, a triggering decision is made without the additional use of second sensor signals 202 supplied by second sensor means 201, on the basis of first sensor means 101, formed as acceleration sensors, or on the basis of first sensor signal 102 supplied by first sensor means 101. Thus, if the restraint system has been switched to a fallback level, restraint means 701-707 of restraint system 700 are triggered only on the basis of first variables 801, acquired by first sensor means 101, for recognizing the vehicle's impact against the obstacle.

Thus, an essential advantage of the safety device for vehicles, and of the method for activating a safety device for vehicles in the case of an impact of a vehicle against an obstacle, is that environmental influences, such as for example ice, snow, rain, or wind, can be acquired for the evaluation of the signals from ultrasound sensors formed as second sensor means 201 and are communicated to control device 501 in such a way that false sensor information, or an absence of sensor information, does not falsify the triggering decision.

In particular, it is advantageous that environmental influences can be detected through a combination of various third sensor means 301-305 and an evaluation of the corresponding third sensor signals 401-405. Advantageously, sensor system 100 has at least one acceleration sensor, i.e. a crash sensor 101, such as for example an acceleration sensor situated in a control device of restraint means.

In addition, sensor system 100 has at least one or more ultrasound sensor means 201 for predictive crash sensing, and at least one additional, third sensor means 301-305 for acquiring environmental influences. The third sensor means include at least a rain sensor 301, a temperature sensor 302, an adhesive friction sensor 303, a video sensor or brightness sensor 304, and an intrinsic speed sensor 305. If no separate adhesive friction sensor 303 can be provided, information concerning the adhesive friction can also be obtained for example from an ABS, ASR, or ESP system present in the vehicle.

The totality of information supplied by third sensor means 301-305 enters into a separate control device 501 or into a control device (not shown) of restraint system 700, in order to enable the correct evaluation of second sensor signals 202 provided by the ultrasound sensor means, i.e. second sensor means 201.

A control device 501 provided in the safety device for vehicles is provided with at least one processor unit 502 on which an evaluation algorithm 503 runs. Evaluation algorithm 503 makes the final decision concerning a triggering or non-triggering of the various restraint means 701-707 situated in restraint system 700.

Advantageously, it is now possible that, if an evaluation of third sensor signals 401-405 supplied by third sensor means 301-305 yields the result that it is possible that the ultrasound sensor means or second sensor means 201 supply no information, or false information, concerning an imminent vehicle impact, evaluation algorithm 501, which makes a triggering decision for restraint means 701-707, can be switched to a fallback level.

In this fallback level, a triggering decision concerning restraint means 701-707 is made without using second sensor signals 202 supplied by second sensor means 201.

Restraint means 701-707, situated in restraint system 700, can relate to any systems in a vehicle that bring the vehicle's occupant or occupants into an optimal seating position, or hold such occupant(s) in an optimal seating position, before or during an impact. Such restraint means include for example belt tighteners that can be operated pyrotechnically or electrically, airbags, roll bars, or actuators in seats.

Although the present invention has been described above on the basis of preferred exemplary embodiments, it is not limited to these, but can be modified in many ways. The invention is also not limited to the cited possible applications.

What is claimed is:

1. A safety device for a vehicle that can be activated upon an impact of the vehicle against an obstacle, comprising:
    a first sensor arrangement for acquiring the vehicle impact and for outputting a first sensor signal;
    a control device for outputting a triggering signal dependent on the first sensor signal;
    a restraint system that is triggered dependent on the first sensor signal for a protection of a vehicle occupant during the vehicle impact;
    a second sensor arrangement for acquiring the obstacle in a vicinity of the vehicle and for outputting a second sensor signal; and
    a third sensor arrangement for acquiring an environmental influence on the second sensor arrangement and for outputting a third sensor signal dependent on the environmental influence;
    wherein the control device determines, based on the second sensor signal, whether to trigger the restraint system after an evaluation of the third sensor signal.

2. The device as recited in claim 1, wherein the first sensor arrangement includes an acceleration sensor.

3. The device as recited in claim 1, wherein the second sensor arrangement includes an ultrasound sensor.

4. The device as recited in claim 3, wherein the sensor signals supplied by the ultrasound sensor are used for the recognition of an upcoming collision only if it has been ensured that the functioning of the ultrasound sensor is not impaired by the environmental influences.

5. The device as recited in claim 1, wherein the restraint system includes a multiplicity of restraint devices.

6. The device as recited in claim 5, wherein the restraint devices include at least one of a driver airbag, a passenger air bag, a knee airbag, a window airbag, a belt tightener, a seat actuator, and a roll bar.

7. The device as recited in claim 1, wherein the first sensor arrangement, the second sensor arrangement, and the third sensor arrangement form a sensor system.

8. The device as recited in claim 1, wherein the third sensor arrangement includes at least one of:
    a rain sensor,
    a temperature sensor,
    an adhesive friction sensor,
    an additional system for determining an adhesive friction,
    a video sensor, and
    an intrinsic speed sensor.

9. The device as recited in claim 1, wherein the third sensor senses a layer of snow on a roadway via a brightness.

10. A method for activating a safety device for a vehicle upon an impact of the vehicle against an obstacle, comprising:
    acquiring a first sensing variable by a first sensor arrangement for recognizing the vehicle impact against the obstacle;
    outputting a first sensor signal via the first sensor arrangement;
    determining by a control device a triggering signal dependent on the first sensor signal;
    triggering a restraint system dependent on the first sensor signal for protecting a vehicle occupant during the vehicle impact against the obstacle;
    acquiring a second sensing variable by a second sensor arrangement for recognizing the vehicle impact against the obstacle;
    outputting a second sensor signal from the second sensor arrangement;
    acquiring a third sensing variable by a third sensor arrangement for recognizing an environmental influence on the second sensor arrangement;
    outputting a third sensor signal from the third sensor arrangement dependent on the environmental influence; and causing the control device to determine, based on the second sensor signal, whether a triggering of the restraint system is to occur after an evaluation of the third sensor signal.

11. The method as recited in claim 10, wherein the evaluation of the third sensor signal output by the third sensor arrangement is carried out in the control device by a processor unit.

12. The method as recited in claim 11, wherein the evaluation of the third sensor signal is carried out in the processor unit by way of an evaluation algorithm.

13. The method as recited in claim 12, wherein the evaluation algorithm is embedded in the processor unit.

14. The method as recited in claim 12, wherein a decision concerning a triggering of the restraint system is carried out by the evaluation algorithm executed in the processor unit.

15. The method as recited in claim 10, further comprising:
acquiring an ambient brightness via one of a video sensor and a brightness sensor of the third sensor arrangement.

16. The method as recited in claim 10, further comprising:
acquiring the environmental influence via one of a temperature sensor and a rain sensor of the third sensor arrangement.

17. The method as recited in claim 10, further comprising:
determining from another signal present in the vehicle an adhesive friction between the vehicle and a roadway by an adhesive friction sensor of the third sensor arrangement.

18. The method as recited in claim 17, further comprising:
determining at least one of a dirtying and an icing of the second sensor arrangement based on the adhesive friction between the vehicle and the roadway.

19. The method as recited in claim 10, further comprising:
switching the restraint system to a fallback level if the evaluation of the third sensor signal in the control device yields a result that the second sensor signal is falsified by the environmental influence.

20. The method as recited in claim 19, further comprising:
when a restraint system control unit is switched to a fallback level, triggering a restraint device of the restraint system without making use of the second sensor signal, on the basis of the first sensing variable.

21. The method as recited in claim 10, further comprising:
acquiring, based on the second sensor signal, a relative speed and a distance between the vehicle and the obstacle, an angle of impact, a time of impact, and a shape of the object.

22. The method as recited in claim 10, further comprising:
recognizing an upcoming collision with the sensor signals supplied by an ultrasound sensor only if it has been ensured that the functioning of the ultrasound sensor is not impaired by the environmental influences.

23. The method as recited in claim 10, wherein the third sensor senses a layer of snow on a roadway via a brightness.

* * * * *